US009231633B1

(12) United States Patent
Petrovic

(10) Patent No.: US 9,231,633 B1
(45) Date of Patent: Jan. 5, 2016

(54) METHOD AND APPARATUS FOR PERFORMING RUN-TIME COMPENSATION OF I/Q MISMATCH IN A BASEBAND SIGNAL

(71) Applicant: Marvell International LTD., Hamilton (BM)

(72) Inventor: Vladan Petrovic, San Jose, CA (US)

(73) Assignee: Marvell International LTD., Hamilton (BM)

( * ) Notice: Subject to any disclaimer, the term of this patent is extended or adjusted under 35 U.S.C. 154(b) by 0 days.

(21) Appl. No.: 14/643,466

(22) Filed: Mar. 10, 2015

Related U.S. Application Data

(60) Provisional application No. 61/954,446, filed on Mar. 17, 2014.

(51) Int. Cl.
*H04L 27/06* (2006.01)
*H04B 1/12* (2006.01)

(52) U.S. Cl.
CPC ...................................... *H04B 1/12* (2013.01)

(58) Field of Classification Search
CPC ...... H04B 1/30; H04B 7/0413; H04B 1/0039; H04B 1/0014; H04B 1/0085; H04B 1/26; H04B 1/0007; H04B 7/0851; H04L 27/3863; H04L 27/364; H04L 27/2647; H04L 2025/03414; H04L 2025/03426; H04L 27/2613; H04L 5/0048; H04L 2025/0377; H04L 25/0206; H04L 2027/003; H04L 2027/0032; H04L 27/22; H04L 27/2649; H04L 27/265; H04L 27/3827; H04L 25/00; H03D 3/009; H03D 7/165; H03D 7/166; H03D 2200/008
USPC .......................................... 375/340; 455/324
See application file for complete search history.

(56) References Cited

U.S. PATENT DOCUMENTS

2004/0219884 A1 11/2004 Mo et al.
2005/0276354 A1 12/2005 Su et al.
2012/0270516 A1* 10/2012 Kang et al. ................. 455/233.1

OTHER PUBLICATIONS

IEEE 802.16; IEEE Standard for Local and Metropolitan Area Networks; Part 16: Air Interface for Broadband Wireless Access Systems: IEEE Computer Society and the IEEE Microwave Theory and Techniques Society; 2009; 2082 Pages.
IEEE 802.20; IEEE Standard for Local and Metropolitan Area Networks; Part 20: Air Interface for Mobile Broadband Wireless Access Systems Supporting Vehicular Mobility—Physical and Media Access Control Layer Specification: IEEE Computer Society; Aug. 29, 2008; 1053 Pages.

(Continued)

*Primary Examiner* — Rahel Guarino

(57) ABSTRACT

A downconversion downconverts a received signal. The downconverted signal includes IQ mismatch. A compensation module generates a compensated signal based on (i) the downconverted signal and (ii) an IQ mismatch compensation value. First and second mixers mix the compensated withal with first and second oscillating signals, respectively. First and second Fast Fourier Transform (FFT) modules perform FFTs on outputs of the first and second mixers to generate a first and second FFT signals, respectively. An IQ mismatch estimation module captures portions of the first and second FFT signals generated in response to the received signal including a first and second predetermined sequences. The IQ mismatch estimation module generates the IQ mismatch compensation value based on: the portions of the first and second FFT signals; the first predetermined sequence; and the second predetermined sequence.

24 Claims, 8 Drawing Sheets

(56) References Cited

OTHER PUBLICATIONS

IEEE P802.11ac/D2.1; Draft Standard for Information Technology—Telecommunications and information exchange between systems—Local and metropolitan area networks—Specific Requirments; Part 11: Wireless LAN Medium Access Control (MAC) and Physical Layer (PHY) specifications; Amendment 4: Enhancements for Very High Throughput for Operation in Bands below 6 GHz; Mar. 2012; 363 Pages.

IEEE P802.11ah™/D1.0 Draft Standard for Information technology—Telecommunications and information exchange between systems Local and metropolitan area networks—Specific requirements Part 11: Wireless LAN Medium Access Control (MAC) and Physical Layer (PHY) Specifications, Amendment 6: Sub 1 GHz License Exempt Operation, 802.11 Working Group of the LAN/MAN Standards Committee of the IEEE Computer Society, Oct. 2013, 394 pages.

IEEE Std. 802.11-2012; IEEE Standard for information technology—Telecommunications and information exchange between systems Local and metropolitan area networks—Specific requirements; Part 11: Wireless LAN Medium Access Control (MAC) and Phsycial Layer (PHY) Specifications; Mar. 29, 2012; 2793 Pages.

IEEE Std. P802.11ad/D5.0; Draft Standard for information technology—Telecommunications and information exchange between systems Local and metropolitan area networks—Specific requirements; Part 11: Wireless LAN Medium Access Control (MAC) and Phsycial Layer (PHY) Specifications; Amendment 3: Enhancements for Very High Throughput in the 60 GHz Band; Sep. 2011; 601 Pages.

Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.

IEEE P802.11ax; Selection Procedure Draft Standard IEEE 802.11-014/0938-03-00ax, Jul. 2014; IEEE 082.11-14/0980r6 IEEE P802.11 Wireless LANs, Jul. 2014; 11ax Evaluation Methodology, Jan. 15, 2015; IEEE 802.11ax Channel Model Document IEEE 802.11-14/0882r4, Sep. 16, 2014; Proposed 802.11ax Functional Requirements, May 2014; Specification Framework for TGax IEEE 802.11-15/0132r2, Jan. 2015; Total pp. 117.

\* cited by examiner

METHOD AND APPARATUS FOR PERFORMING RUN-TIME COMPENSATION OF I/Q MISMATCH IN A BASEBAND SIGNAL

CROSS-REFERENCE TO RELATED APPLICATIONS

This application claims the benefit of U.S. Provisional Application No. 61/954,446, filed on Mar. 17, 2014. The entire disclosure of the application referenced above is incorporated herein by reference.

FIELD

The present disclosure relates to wireless communication and more particularly to systems and methods for compensating for IQ mismatch experienced at a radio frequency receiver.

BACKGROUND

A radio frequency (RF) receiver can downconvert a modulated signal at a carrier frequency to a baseband frequency. During the downconversion of the modulated signal, certain receiver impairments are introduced due to non-ideal behavior caused by, for example, component process-voltage-temperature (PVT) variations. The receiver impairments degrade system performance. Receiver impairments introduced by a homodyne (direct-conversion) receiver include carrier frequency offset (CFO), IQ mismatch, DC offset, phase noise, etc. The receiver impairments can be minimized via signal processing.

FIG. 1 illustrates an ideal downconversion circuit 10, operating based on local oscillator (LO) signals (cosine and sine signals) that are 90° out-of-phase from one another. The downconversion circuit 10 includes a first mixer 12, a second 14, a first low pass filters (LPF) 16 and a second LPF 18. The mixers 12, 14 receive an RF modulated signal $x_{RF}(t)$. The modulated signal $x_{RF}(t)$ includes a baseband signal $x(t)$ that is shifted to a carrier frequency ($\omega_c$). The modulated signal $x_{RF}(t)$ may be represented by equation 1, and the baseband signal may be represented by equation 2.

$$x_{RF}(t)=x_I(t)\cos\omega_c t - x_Q(t)\sin\omega_c t \qquad (1)$$

$$x(t)=x_I(t)+jx_Q(t) \qquad (2)$$

The mixers 12, 14 receive and multiply the modulated signal $x_{RF}(t)$ by local oscillator signals $2\cos\omega_c t$ and $2\sin\omega_c t$ to generate I and Q baseband signal components $x_I(t)\cos\omega_c t$ and $x_Q(t)\sin\omega_c t$, respectively, and some unwanted high frequency components. This may be referred to as quadrature mixing. $x_I(t)$ and $x_Q(t)$ include I and Q baseband components, respectively, and $\omega_c$ is the carrier frequency. The filters 16, 18 filter out the high frequency components from the outputs of the mixers 16, 18.

Deviation from 90° difference in phase between the I and Q baseband signal components and difference in gains between the I and Q baseband signal components results in distortion and degraded quality of the resulting baseband signal $x(t)$. Deviation of the local oscillator (LO) frequency ($\omega_c$) from the actual frequency of the carrier signal results in carrier frequency offset (CFO) and also degraded quality of the resulting baseband signal $x(t)$.

FIG. 2 illustrates another downconversion circuit 20 operating based on local oscillator signals that are both gain mismatched and phase mismatched. The gain mismatch is modeled by the variable $\epsilon$, and the phase mismatch is modeled by the variable $\theta$. The downconversion circuit 20 includes a first mixer 22, a second mixer 24, a first low pass filter 26, and a second low pass filter 28. The mixers 22, 24 receive and multiply a modulated signal $x_{RF}(t)$ by local oscillator signals $$2\left(1+\frac{\varepsilon}{2}\right)\cos\left(\omega_c t+\frac{\theta}{2}\right), -2\left(1-\frac{\varepsilon}{2}\right)\sin\left(\omega_c t-\frac{\theta}{2}\right)$$

that are gain mismatched and phase mismatched, resulting in non-ideal downconversion.

The non-ideal downconverson results in mixing of I and Q components of the corresponding baseband signal components to provide received signal components $w_I(t)$ and $w_Q(t)$ having IQ mismatch. The received signal components with $w_I(t)$ and $w_Q(t)$ may be represented by equations 3 and 4, where $\epsilon$ and $\theta$ are respectively gain and phase mismatch parameters.

$$w_I(t)=\left(1+\frac{\varepsilon}{2}\right)\left(x_I(t)\cos\frac{\theta}{2}+x_Q(t)\sin\frac{\theta}{2}\right) \qquad (3)$$

$$w_Q(t)=\left(1-\frac{\varepsilon}{2}\right)\left(x_I(t)\sin\frac{\theta}{2}+x_Q(t)\cos\frac{\theta}{2}\right) \qquad (4)$$

In equation 3, $w_I(t)$ includes a Q component ($x_Q(t)$). In equation 4, $w_Q(t)$ includes an I component ($x_I(t)$). Equations 3 and 4 can be represented in complex form, as shown by equation (5), where equation 6 provides the received signal $w(t)$ with IQ mismatch, equation 7 provides the baseband equivalent received signal prior to IQ mismatch $x(t)$, and equation 8 provides a corresponding complex IQ mismatch parameter a.

$$w(t)= \qquad (5)$$
$$\left(\cos\frac{\theta}{2}-j\frac{\varepsilon}{2}\sin\frac{\theta}{2}\right)x(t)+\left(\frac{\varepsilon}{2}\cos\frac{\theta}{2}+j\sin\frac{\theta}{2}\right)x^*(t)\approx x(t)+a(m)\cdot x^*(t)$$

$$w(t)=w_I(t)+jw_Q(t) \qquad (6)$$

$$x(t)=x_I(t)+jx_Q(t) \qquad (7)$$

$$a=\frac{\varepsilon}{2}+j\frac{\theta}{2} \qquad (8)$$

A final approximation in equation 5 for the received signal $w(t)$ may be obtained by assuming that the gain and phase mismatch parameters $\epsilon$ and $\theta$, respectively, are small values. In the frequency domain, the received signal $w(t)$ may be represented by equation 9, which shows that IQ mismatch introduces an image $a \cdot X^*(-f)$ into the corresponding signal spectrum.

$$W(f)=X(f)+a \cdot X^*(-f) \qquad (9)$$

The image $a \cdot X^*(-f)$ is a frequency byproduct of the actual signal $X(f)$.

SUMMARY

In a feature, a receiver is described. A downconversion module is configured to (i) receive a signal and (ii) downconvert the signal to generate a downconverted signal, wherein the downconverted signal includes IQ mismatch. A compensation module is configured to generate a compensated signal based on (i) the downconverted signal and (ii) an IQ mismatch compensation value. A first mixer is configured to mix the compensated signal with a first oscillating signal generated by a local oscillator to shift a frequency of the compensated signal. A second mixer is configured to mix the compensated signal with a second oscillating signal to shift a frequency of the compensated signal. A first Fast Fourier Transform (FFT) module is configured to perform a FFT on an output of the first mixer to generate a first FFT signal. A second FFT module is configured to perform a FFT on an output of the second mixer to generate a second FFT signal. An IQ mismatch estimation module is configured to: capture a first portion of the first FFT signal and a second portion of the first FFT signal generated in response to the received signal including a first predetermined sequence and a second predetermined sequence, respectively; capture a first portion of the second FFT signal and a second portion of the second FFT signal generated in response to the received signal including the first predetermined sequence and the second predetermined sequence, respectively; and generate the IQ mismatch compensation value based on: (i) the first portions of the first and second FFT signals; (ii) the second portions of the first and second FFT signals; (iii) the first predetermined sequence; and (iv) the second predetermined sequence.

In a feature, a receiver includes a downconversion module configured to (i) receive a signal and (ii) downconvert the signal to generate a downconverted signal that includes IQ mismatch. A first mixer is configured to (i) mix the downconverted signal with a first oscillating signal generated by a local oscillator and (ii) generate a first shifted signal. A second mixer is configured to (i) mix the downconverted signal with a second oscillating signal and (ii) generate a second shifted signal. A first Fast Fourier Transform (FFT) module is configured to perform a FFT on the first shifted signal to generate a first FFT signal. A second Fast Fourier Transform (FFT) module is configured to perform a FFT on the second shifted signal to generate a second FFT signal. A compensation module is configured to generate a compensated FFT signal based on the first FFT signal and IQ mismatch compensation values for frequency sub-bands, respectively. An IQ mismatch estimation module is configured to: capture a first portion of the first FFT signal and a second portion of the first FFT signal generated in response to the received signal including first and second predetermined sequences, respectively; capture a first portion of the second FFT signal and a second portion of the second FFT signal generated in response to the received signal including the first and second predetermined sequences, respectively; and generate the IQ mismatch compensation values for the frequency sub-bands, respectively, based on: (i) the first portions of the first and second FFT signals; (ii) the second portions of the first and second FFT signals; (iii) the first predetermined sequence; and (iv) the second predetermined sequence.

In other features, a method of compensating for IQ mismatch includes: receiving a signal at a receiver; downconverting the signal to generate a downconverted signal, wherein the downconverted signal includes IQ mismatch; generating a compensated signal based on (i) the downconverted signal and (ii) an IQ mismatch compensation value; performing a first mixing of the compensated signal with a first oscillating signal generated by a local oscillator to shift a frequency of the compensated signal; performing a second mixing of the compensated signal with a second oscillating signal to shift a frequency of the compensated signal; performing a Fast Fourier Transform (FFT) on a result of the first mixing to generate a first FFT signal; performing a FFT on a result of the second mixing to generate a second FFT signal; and capturing a first portion of the first FFT signal and a second portion of the first FFT signal generated in response to the received signal including a first predetermined sequence and a second predetermined sequence, respectively; capturing a first portion of the second FFT signal and a second portion of the second FFT signal generated in response to the received signal including the first predetermined sequence and the second predetermined sequence, respectively; and generating the IQ mismatch compensation value based on: (i) the first portions of the first and second FFT signal; (ii) the second portions of the first and second FFT signals; (iii) the first predetermined sequence; and (iv) the second predetermined sequence.

In other features, a method of compensating for IQ mismatch includes: receiving a signal at a receiver; downconverting the signal to generate a downconverted signal that includes IQ mismatch; mixing the downconverted signal with a first oscillating signal generated by a local oscillator to produce a first shifted signal; mixing the downconverted signal with a second oscillating signal to produce a second shifted signal; performing a Fast Fourier Transform (FFT) on the first shifted signal to generate a first FFT signal; performing a FFT on the second shifted signal to generate a second FFT signal; generating a compensated FFT signal based on the first FFT signal and IQ mismatch compensation values for frequency sub-bands, respectively; capturing a first portion of the first FFT signal and a second portion of the first FFT signal generated in response to the received signal including first and second predetermined sequences, respectively; capturing a first portion of the second FFT signal and a second portion of the second FFT signal generated in response to the received signal including the first and second predetermined sequences, respectively; and generating the IQ mismatch compensation values for the frequency sub-bands, respectively, based on: (i) the first portions of the first and second FFT signals; (ii) the second portions of the first and second FFT signals; (iii) the first predetermined sequence; and (iv) the second predetermined sequence.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Non-ideal downconverson of a received signal $x_{RF}(t)$ at a receiver results in a received baseband signal w(t) with I and Q components, $w_I(t)$ and $w_Q(t)$, having IQ mismatch. Compensation may be applied in the time domain to minimize the IQ mismatch. The compensation may be represented by equation 10, where a is a complex IQ mismatch introduced by the non-ideal downconversion, â is a complex compensation coefficient (or an estimated value of IQ mismatch), Δâ is a residual IQ mismatch after compensation and is equal to a−â, w*(t) is the conjugate of the received baseband signal w(t), and x*(t) is the conjugate of the desired received signal free of mismatch x(t).

$$z(t)=w(t)-\hat{a}w^*(t)\approx x(t)+(a-\hat{a})x^*(t)=x(t)+\Delta\hat{a}\cdot x^*(t) \quad (10)$$

Although the complex compensation coefficient â may be determined using an offline calibration procedure, the following examples estimate complex compensation coefficients based on received signals during system operation (e.g., during run-time). The following examples address receiver IQ mismatch estimation and compensation based on received time domain samples during system run-time without interruption to system operations. This indirectly accounts for IQ mismatch changes due to temperature variations and/or aging of system components. This provides a robust system that accounts for changes in the IQ mismatch coefficient a as a result of changes in temperature and/or component performance due to aging.

To improve performance, CFO is estimated and compensated for by the receiver. CFO correction/compensation can be performed in the RF or the baseband. If the CFO changes slowly, the CFO can be corrected by adjusting the frequency of the local oscillator. If the CFO correction changes more quickly from packet to packet, CFO may be performed in the baseband to avoid local oscillator frequency settling transients. While CFO mismatch correction/compensation can be performed in the RF portion, the following examples will be discussed in terms of baseband correction.

Figure 1:
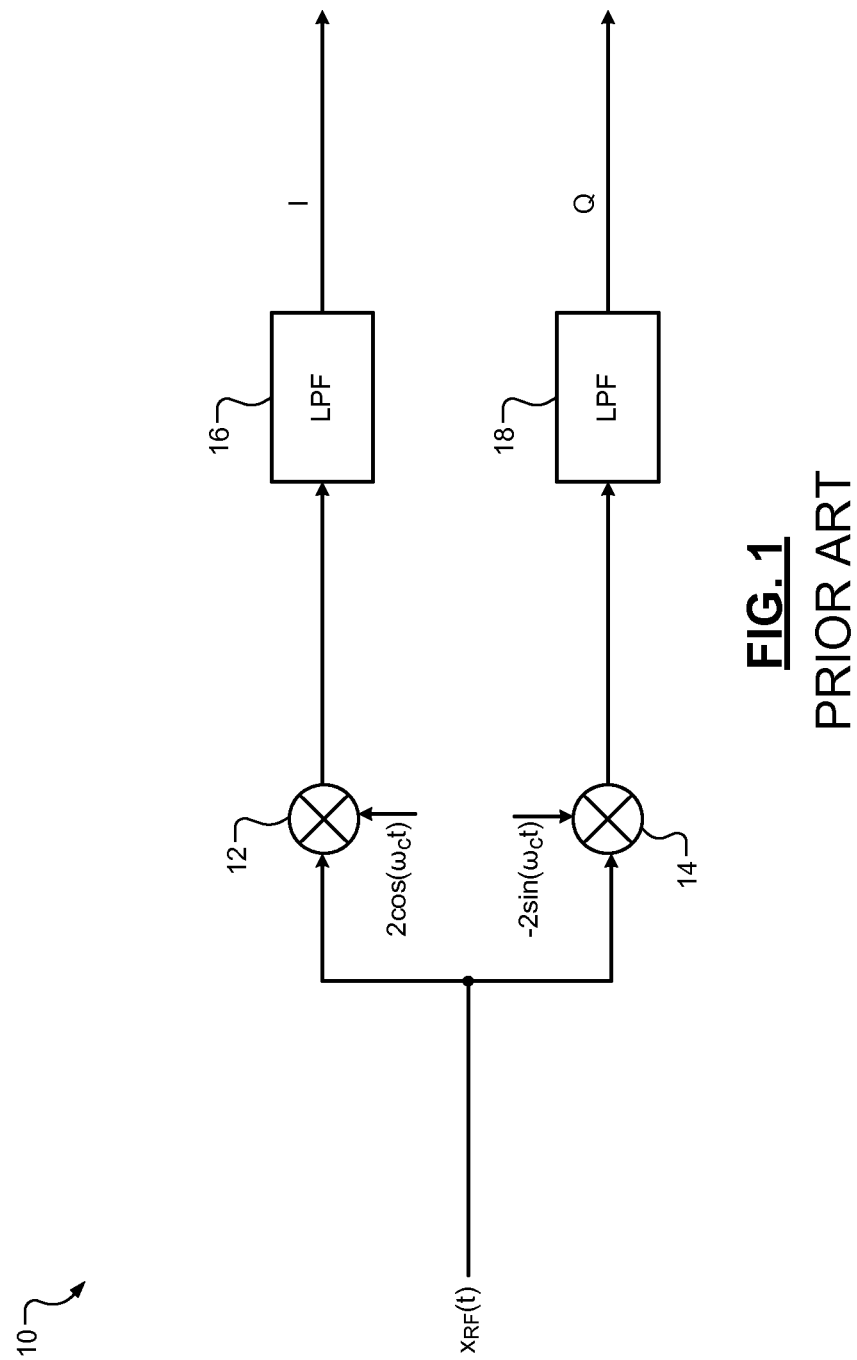
FIG. 1 is a schematic view of a downconversion circuit operating based on 90° out-of-phase local oscillator signals.
Figure 2:
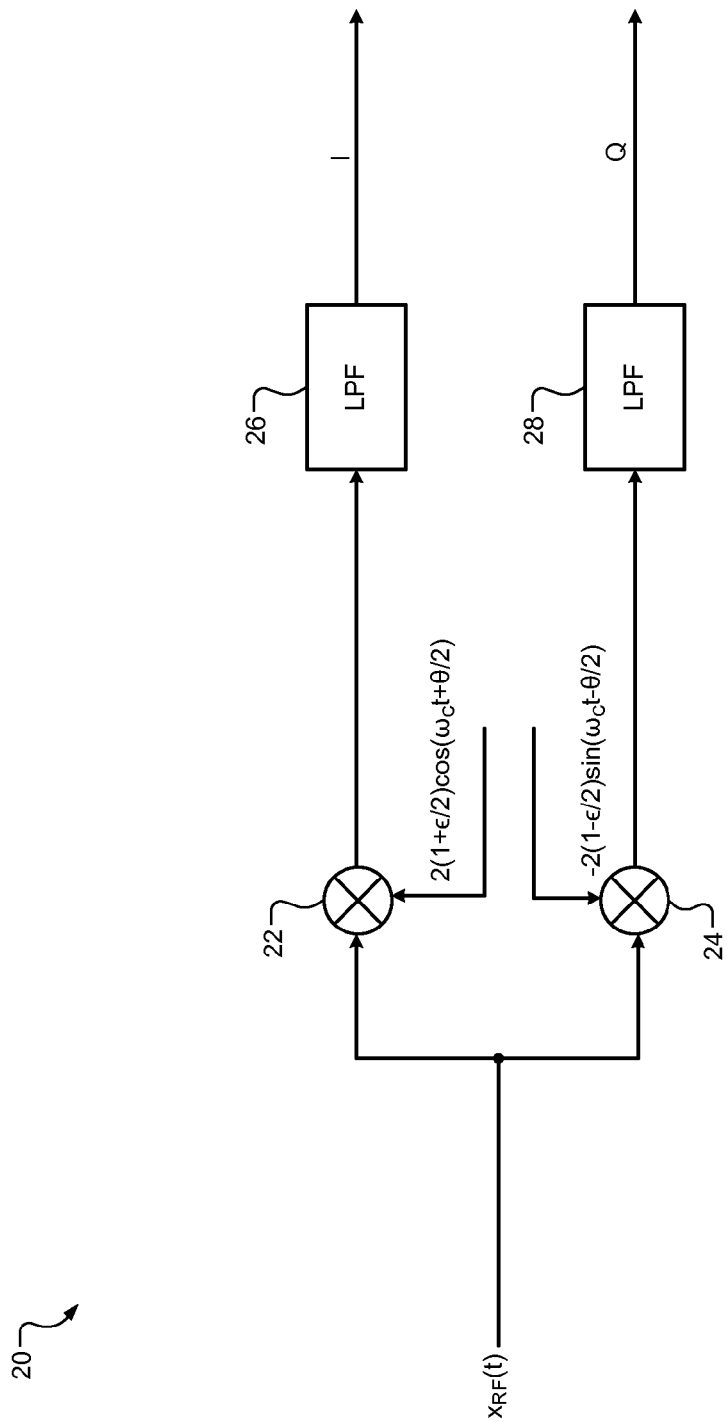
FIG. 2 is a schematic view of another downconversion circuit operating based on local oscillator signals that are gain and phase mismatched relative to each other.
Figure 3:
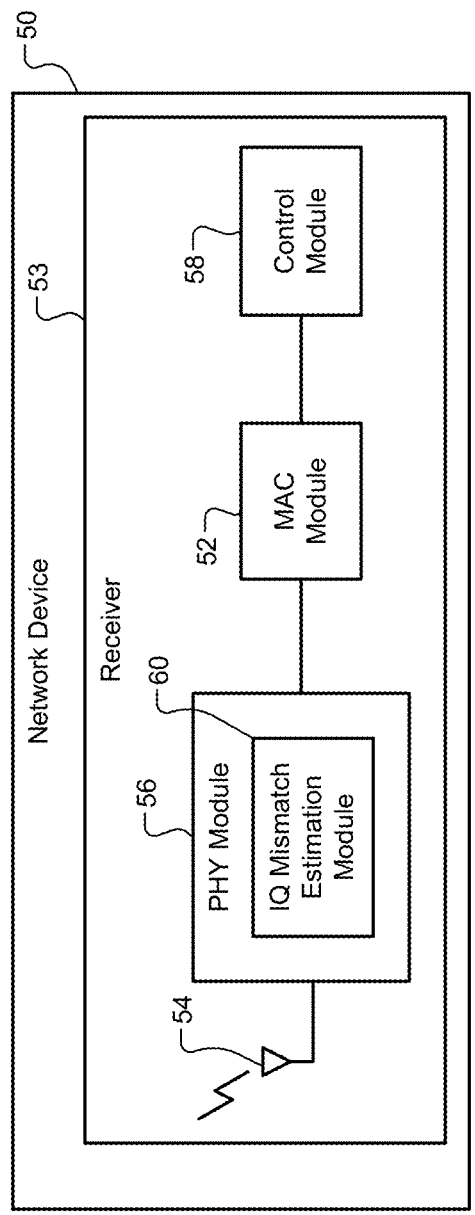
FIG. 3 is a functional block diagram of a network device incorporating a medium access control module performing IQ mismatch estimation and compensation in accordance with an implementation of the present disclosure.

FIG. 3 shows a network device 50 incorporating a medium access control (MAC) module 52 performing IQ mismatch estimation and compensation. The network device 50 may refer to a computer, a tablet, a mobile device, a cellular phone, a router, an appliance, a tool, and/or other network device. Network devices may wirelessly communicate with each other or other wireless network devices using Institute of Electrical and Electronic Engineers (IEEE), Wi-Fi™, Bluetooth®, and/or other wireless protocols. Wireless signals transmitted by the network devices may be radio frequency (RF) and/or frequency modulated (FM) signals. The wireless signals may be transmitted in, for example, the Industrial, Scientific and Medical (ISM) 2.4 GHz short-range radio frequency band or other suitable band.

The network device 50 includes a receiver 53. The receiver 53 includes the MAC module 52, an antenna 54, and a physical layer (PHY) module 56. The receiver 53 also includes a control module 58. The PHY module 56 may include an IQ mismatch estimation module 60, which estimates IQ mismatch.

During operation of the network device 50, a signal is received via the antenna 54. The PHY module 56 demodulates and downconverts the received signal to generate a downconverted signal. The downconverted signal may have IQ mismatch, which is estimated by the IQ mismatch estimation module 60. The MAC module 52 compensates for the IQ mismatch prior to providing a resultant signal and/or corresponding data to the MAC module 52 where one of more actions may be taken before resulting signals are output to the control module 58. Although shown as being performed in the PHY module 56, the IQ mismatch estimation and compensation may be performed by the MAC module 52.

Figure 4:
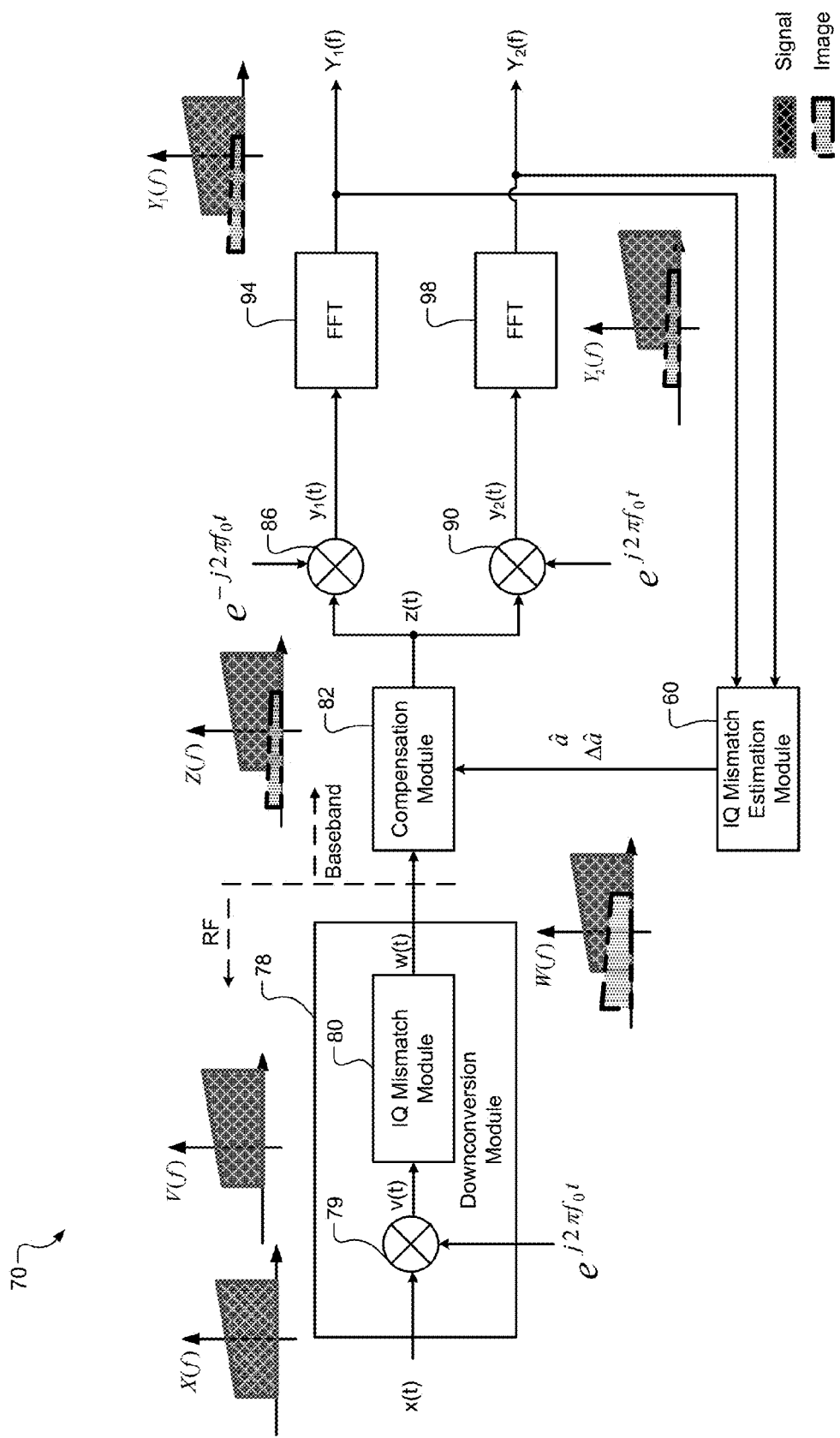
FIG. 4 is a schematic view of an IQ mismatch compensation circuit in accordance with an implementation of the present disclosure.

FIG. 4 shows an IQ mismatch compensation circuit 70. The IQ mismatch compensation circuit 70 includes a downconversion module 78, a compensation module 82, mixers 86 and 90, and Fast Fourier Transform (FFT) modules 94 and 98. The downconversion module 78 includes a CFO mismatch module 79 and an IQ mismatch module 80. While the following example will be discussed in terms of performing CFO compensation in the baseband domain, CFO compensation may be made in the RF domain.

The CFO mismatch module 79 mixes (multiplies) the received signal x(t) with a CFO signal $e^{j2\pi f_0 t}$ to generate a mixed signal v(t). Multiplication with the CFO signal may model what is happening via non-ideal downconversion. CFO is an unwanted quantity and stems from the fact that local oscillator frequencies at the transmitter and the receiver 53 are different due to being different devices. The multiplication introduces CFO mismatch. Example illustrations of the received signal x(t) and the mixed signal v(t) in the frequency domain X(f) and V(f) are provided in FIG. 4. The baseband equivalent received signal x(t) can be represented by equation 11, while the mixed signal v(t) can be represented by equation 12.

$$x(t)=h(t)*s(t)+n(t) \quad (11)$$

$$v(t)=x(t)e^{j2\pi f_0 t} \quad (12)$$

x(t) is the received signal, h(t) is a channel impulse response, s(t) is a transmitted signal, and n(t) is noise at the receiver 53. v(t) is the mixed signal, and $f_O$ is the CFO introduced by a local oscillator.

The IQ mismatch module 80 downconverts the mixed signal v(t) to produce a downconverted signal w(t). This is represented by equation 13.

$$w(t)=v(t)+a\cdot v^*(t) \quad (13)$$

Equation 13 illustrates the IQ mismatch and illustrates that the downconversion introduces an Image a·v*(t) into the signal spectrum. An example illustration of the downconverted signal w(t) in the frequency domain W(f) (then including both a signal component and an image component) is provided in FIG. 4.

The compensation module 82 applies compensation for the IQ mismatch. As a result, the compensation module 82 produces a compensated signal z(t). The application of compensation can be represented by equation 14.

$$z(t)=w(t)-\hat{a}\cdot w^*(t)\approx v(t)+\Delta a\cdot v^*(t) \quad (14)$$

â is a complex compensation coefficient, Δâ is a residual compensation coefficient, and z(t) is the compensated signal. w*(t) is the conjugate of the downconverted signal w(t). An example illustration of the compensated signal z(t) in the frequency domain Z(f) is provided in FIG. 4. The IQ mismatch estimation module 60 determines and provides the complex compensation coefficient â, as discussed further below.

The mixer 90 mixes (multiplies) the compensated signal z(t) with the CFO signal $e^{j2\pi f_0 t}$ to shift and center the image component. The mixer 86 mixes (multiplies) the compensated signal z(t) with a CFO correction signal $e^{-j2\pi f_0 t}$ to shift and center the signal component. The mixers 86 and 90 generate first and second resultant signals $y_1(t)$ and $y_2(t)$, which can be represented by equations 15 and 16, respectively.

$$y_1(t)=z(t)e^{-j2\pi f_0 t}=v(t)e^{-j2\pi f_0 t}+\Delta a(v(t)e^{j2\pi f_0 t})^* = x(t)+\Delta a(x(t)e^{j2\pi(2f_0)t})^* \approx x(t)+\Delta a \cdot y^*_2(t) \quad (15)$$

$$y_2(t)=z(t)e^{j2\pi f_0 t}=v(t)e^{j2\pi f_0 t}+\Delta a(v(t)e^{-j2\pi f_0 t})^* = x(t)e^{j2\pi(2f_0)t}+\Delta a \cdot x^*(t) \quad (16)$$

* denotes a complex conjugate of the corresponding signal. For example, $y^*_2(t)$ is a complex conjugate of $y_2(t)$.

The FFT modules 94 and 98 perform FFTs on the first and second resultant signals $y_1(t)$ and $y_2(t)$ to generate first and second FFT signals $Y_1(f)$ and $Y_2(f)$, respectively. In the first FFT signal $Y_1(f)$, the signal component is CFO corrected. In the second FFT signal $Y_2(f)$, the image component is CFO corrected. The IQ mismatch estimation module 60 determines the complex compensation coefficient â and the residual compensation coefficient $\Delta$â based on the first FFT signal $Y_1(f)$ generated in response to one or more signals received during normal operation. The first and second resultant signals $y_1(t)$ and $y_2(t)$, and/or the first and second FFT signals $Y_1(f)$ and $Y_2(f)$ may be provided to other time and/or frequency processing modules of the PHY module 56, the MAC module 52, and/or the control module 58 of the network device 50 of FIG. 3.

Figure 5:
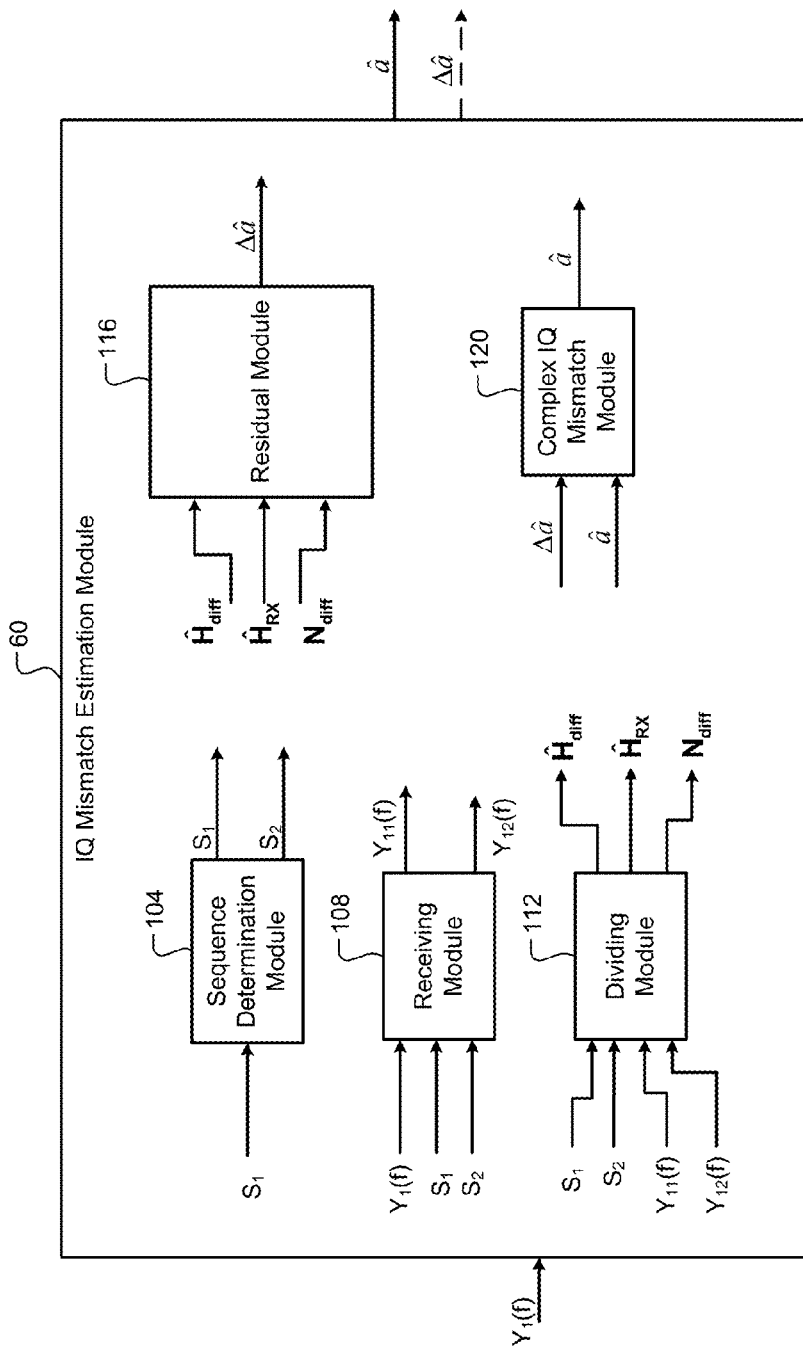
FIG. 5 is a functional block diagram of an IQ mismatch estimation module in accordance with an implementation of the present disclosure.

FIG. 5 shows an example implementation of the IQ mismatch estimation module 60. The IQ mismatch estimation module 60 determines the complex compensation coefficient â and the residual compensation coefficient $\Delta$â based on the first FFT signal $Y_1(f)$ generated in response to known signals received during normal operation. The known signals may include, for example, channel estimation signals or synchronization signals transmitted by a transmitter.

Based on the relationships for the received signal x(t), the first resultant signal $y_1(t)$, and converting to the frequency domain, equation 17 can be derived.

$$Y_1(k)=H(k)S(k)+\Delta a \cdot Y^*_2(-k)+N(k) \quad (17)$$

S(k) refers to a sequence of known transmitted data, H(k) refers to the communication channel, and N(k) refers to noise. Known sequences are used, for example, for channel estimation and synchronization.

The following example will be discussed in terms of receiving two known sequences $S_1(k)$ and $S_2(k)$. When only one known sequence is transmitted and received, a sequence determination module 104 may determine a second sequence for use in determining the complex compensation coefficient â and/or the residual compensation coefficient $\Delta$â by, for example, slicing or decoding the one known sequence. For example, in some WiFi systems, a sequence for the L-LTF symbol is transmitted and known at the receiver 53. The sequence determination module 104 may determine a second sequence for the L-SIG symbol carrying control data by equalizing and slicing the received sequence during the L-SIG symbol.

Assuming that the communication channel H(k) is substantially constant between the reception of the two known sequences $S_1(k)$ and $S_2(k)$, equations 18 and 19 describe the resulting $Y_1(k)$ signals, $Y_{11}(k)$ and $Y_{12}(k)$, respectively.

$$Y_{11}(k)=H(k)S_1(k)+\Delta a \cdot Y^*_{21}(-k)+N_1(k) \quad (18)$$

$$Y_{12}(k)=H(k)S_2(k)+\Delta a \cdot Y^*_{22}(-k)+N_2(k) \quad (19)$$

A receiving module 108 receives the resulting $Y_1(k)$ and $Y_2(k)$ signals and stores the $Y_{11}(k)$ and $Y_{21}(k)$ resulting from the first known sequence $S_1(k)$. The receiving module 108 also stores the $Y_{12}(k)$ and $Y_{22}(k)$ resulting from the second known sequence $S_2(k)$.

A dividing module 112 divides the resulting signals $Y_{11}(k)$ and $Y_{12}(k)$ by the first and second known sequences $S_1(k)$ and $S_2(k)$, respectively. The results produced by the dividing module 112 can be represented by equation 20.

$$\hat{H}_{diff}(k)=\Delta a \cdot \hat{H}_{RX}(k)+N_{diff}(k), \quad (20)$$

where $$\hat{H}_{diff}(k) \doteq Y_{11}(k)/S_1(k)-Y_{12}(k)/S_2(k) \quad (21)$$

$$\hat{H}_{RX}(k) \doteq Y^*_{21}(-k)/S_1(k)-Y^*_{22}(-k)/S_2(k), \text{ and} \quad (22)$$

$$N_{diff}(k) \doteq N_1(k)/S_1(k)-N_2(k)/S_2(k), \quad (23)$$

for k=0, 1, ..., N−1, where N is the number of subcarriers in the signal bandwidth.

Stacking equations 20, 21, 22, and 23 for all of the subcarriers yields equations 24, 25, 26, and 27.

$$\hat{H}_{diff}=\hat{H}_{RX} \cdot \Delta \hat{a}+N_{diff}, \text{ where} \quad (24)$$

$$\hat{H}_{diff} \doteq [\hat{H}_{diff}(0)\hat{H}_{diff}(1)\ldots \hat{H}_{diff}(N-1)]^T, \quad (25)$$

$$\hat{H}_{RX} \doteq [\hat{H}_{RX}(0)\hat{H}_{RX}(1)\ldots \hat{H}_{RX}(N-1)]^T, \text{ and} \quad (26)$$

$$N_{diff} \doteq [N_{diff}(0)N_{diff}(1)\ldots N_{diff}(N-1)]^T. \quad (27)$$

The following linear least squares (LS) problem, represented by equation 28, can be determined based on equations 24, 25, 26, and 27.

$$\Delta \hat{a} = \underset{\Delta a}{\text{argmin}} \|\hat{H}_{diff}-\hat{H}_{RX} \cdot \Delta a\|^2 \Rightarrow \Delta \hat{a} = (\hat{H}^T_{RX}\hat{H}_{RX})^{-1}\hat{H}^T_{RX}\hat{H}_{diff} \quad (28)$$

A residual module 116 estimates the residual compensation coefficient $\Delta$â by solving equation (28) using linear least squares. The residual module 116 estimates the residual compensation coefficient $\Delta$â in each packet or frame. The residual compensation coefficients $\Delta$â are used to update the respective complex compensation coefficients â.

A complex IQ mismatch module 120 updates the complex compensation coefficient â for a next packet based on the estimate of the residual compensation coefficient $\Delta$â of the current packet the complex compensation coefficient â of the current packet. For example, the complex IQ mismatch module 120 may update the complex compensation coefficient â according to equation 29.

$$\hat{a}(m+1)=\hat{a}(m)+\mu \cdot \max(-\delta,\min(\Delta \hat{a}(m),\delta)), \quad (29)$$

where m is the current packet index, μ is a predetermined scaling value and may be relatively small, and δ is a predetermined saturation value used to limit the impact of outliers. The compensation module 82 compensates for the IQ mismatch using the complex compensation coefficient â and generates the compensated signal z(t) based on the downconverted signal w(t), as described above.

Figure 6:
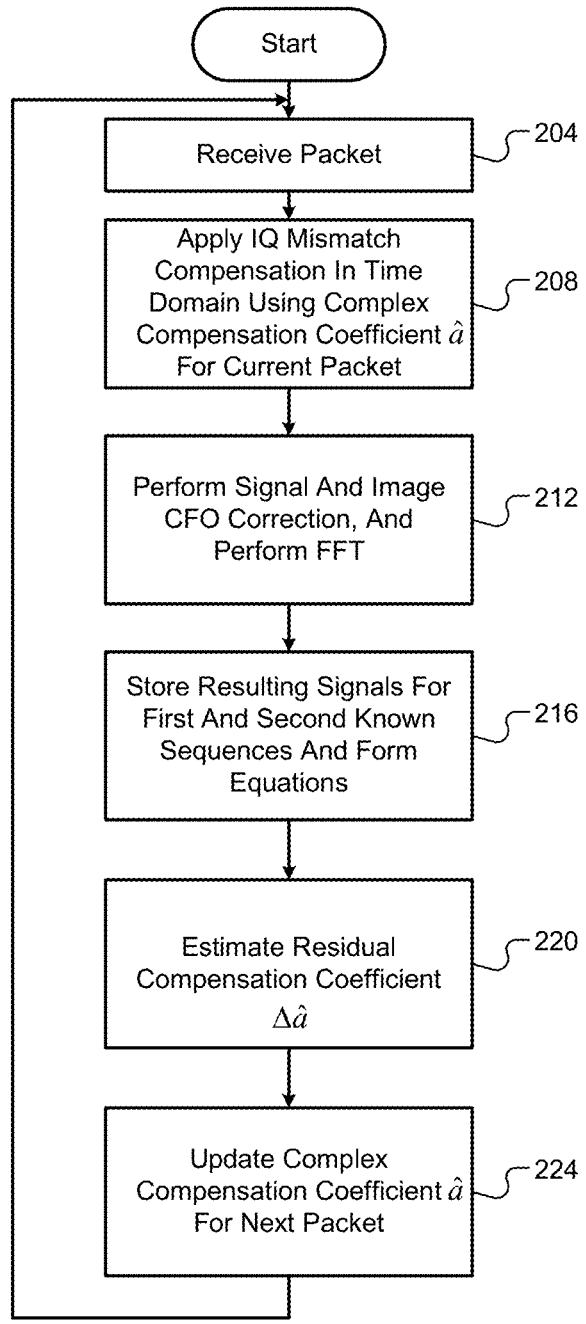
FIG. 6 is a flowchart depicting an example method of performing IQ mismatch compensation in accordance with an implementation of the present disclosure.

FIG. 6 is a flowchart depicting an example method of performing IQ mismatch compensation. Control begins with 204 where the receiver 53 receives signals X(t) for a packet via the antenna 54. The downconversion module 78 downconverts the received signal x(t) and, in the process, introduces CFO (modeled by v(t)) and IQ mismatch (modeled by w(t)). At 208, the compensation module 82 applies compensation to the downconverted signal w(t) in the time domain using the complex compensation coefficient â(m) for the current (m-th) packet. The compensation module 82 produces the compensated signal z(t).

At 212, the mixers 86 and 90 perform signal and image CFO correction on the compensated signal z(t) to produce the first and second resultant signals $y_1(t)$ and $y_2(t)$. Also, the FFT modules 94 and 98 perform FFTs on the first and second resultant signals $y_1(t)$ and $y_2(t)$ to generate first and second FFT signals $Y_1(f)$ and $Y_2(f)$, respectively.

The receiving module 108 captures the first FFT signal $Y_1(f)$ and the second FFT signal $Y_2(f)$ resulting from the first known sequence $S_1(k)$ and captures the first FFT signal $Y_1(f)$ and the second FFT signal $Y_2(f)$ resulting from the second known sequence $S_2(k)$ at 216. The captured signals are $Y_{11}(k)$, $Y_{12}(k)$, $Y_{21}(k)$, and $Y_{22}(k)$. The dividing module 112 divides the captured signals $Y_{11}(k)$ and $Y_{21}(k)$ by the first known sequences $S_1(k)$ and divides the captured signals $Y_{12}(k)$ and $Y_{22}(k)$ by the second known sequence $S_2(k)$, to form equations $$\hat{H}_{\text{diff}}(k) = \Delta\hat{a} \cdot \hat{H}_{RX}(k) + N_{\text{diff}}(k), \text{ where} \quad (20)$$

$$\hat{H}_{\text{diff}}(k) \doteq Y_{11}(k)/S_1(k) - Y_{12}(k)/S_2(k) \quad (21)$$

$$\hat{H}_{RX}(k) \doteq Y^*_{21}(-k)/S_1(k) - Y^*_{22}(-k)/S_2(k), \text{ and} \quad (22)$$

$$N_{\text{diff}}(k) \doteq N_1(k)/S_1(k) - N_2(k)/S_2(k), \quad (23)$$

for each subcarrier $k = 0, 1, \ldots, N-1$, where N is the number of subcarriers in the signal bandwidth. These values may be put in the form of vectors, as described above.

At 220, the residual module 116 determines the residual compensation coefficient $\Delta\hat{a}(m)$ for the current (m-th) packet, for example, using equation 28.

$$\Delta\hat{a}(m) = (\hat{H}_{RX}^T \hat{H}_{RX})^{-1} \hat{H}_{RX}^T \hat{H}_{\text{diff}} \quad (28)$$

where $$\hat{H}_{\text{diff}} \doteq [\hat{H}_{\text{diff}}(0) \hat{H}_{\text{diff}}(1) \ldots \hat{H}_{\text{diff}}(N-1)]^T \text{ and}$$

$$\hat{H}_{RX} \doteq [\hat{H}_{RX}(0) \hat{H}_{RX}(1) \ldots \hat{H}_{RX}(N-1)]^T$$

The complex IQ mismatch module 120 determines the complex compensation coefficient â(m+1) for the next (m+1 th) packet at 224 based on the $\Delta\hat{a}(m)$ for the current (m-th) packet and the complex compensation coefficient â(m) for the current (m-th) packet. For example, the complex IQ mismatch module 120 may determine the complex compensation coefficient â(m+1) for the next (m+1 th) packet using equation 29.

$$\hat{a}(m+1) = \hat{a}(m) + \mu \cdot \max(-\delta, \min(\Delta\hat{a}(m), \delta)), \quad (29)$$

Control then returns to 204 for the next (m+1 th) packet, where this complex compensation coefficient â(m +1) will be used to compensate for IQ mismatch.

The IQ mismatch may be constant (or approximately constant) across the entire signal bandwidth. In such a case, the above applies. In some circumstances, however, the IQ mismatch may be frequency dependent. Where the IQ mismatch is frequency dependent, the signal bandwidth can be divided into multiple sub-bands and the above can be used to estimate a complex compensation coefficient â for each sub-band, $i = 0, 1, \ldots, I-1$, where I is equal to the number of sub-bands. Where the IQ mismatch is frequency dependent, the data path is modified to apply IQ mismatch compensation in the frequency domain (i.e., post FFT) instead of in time domain.

Figure 7:
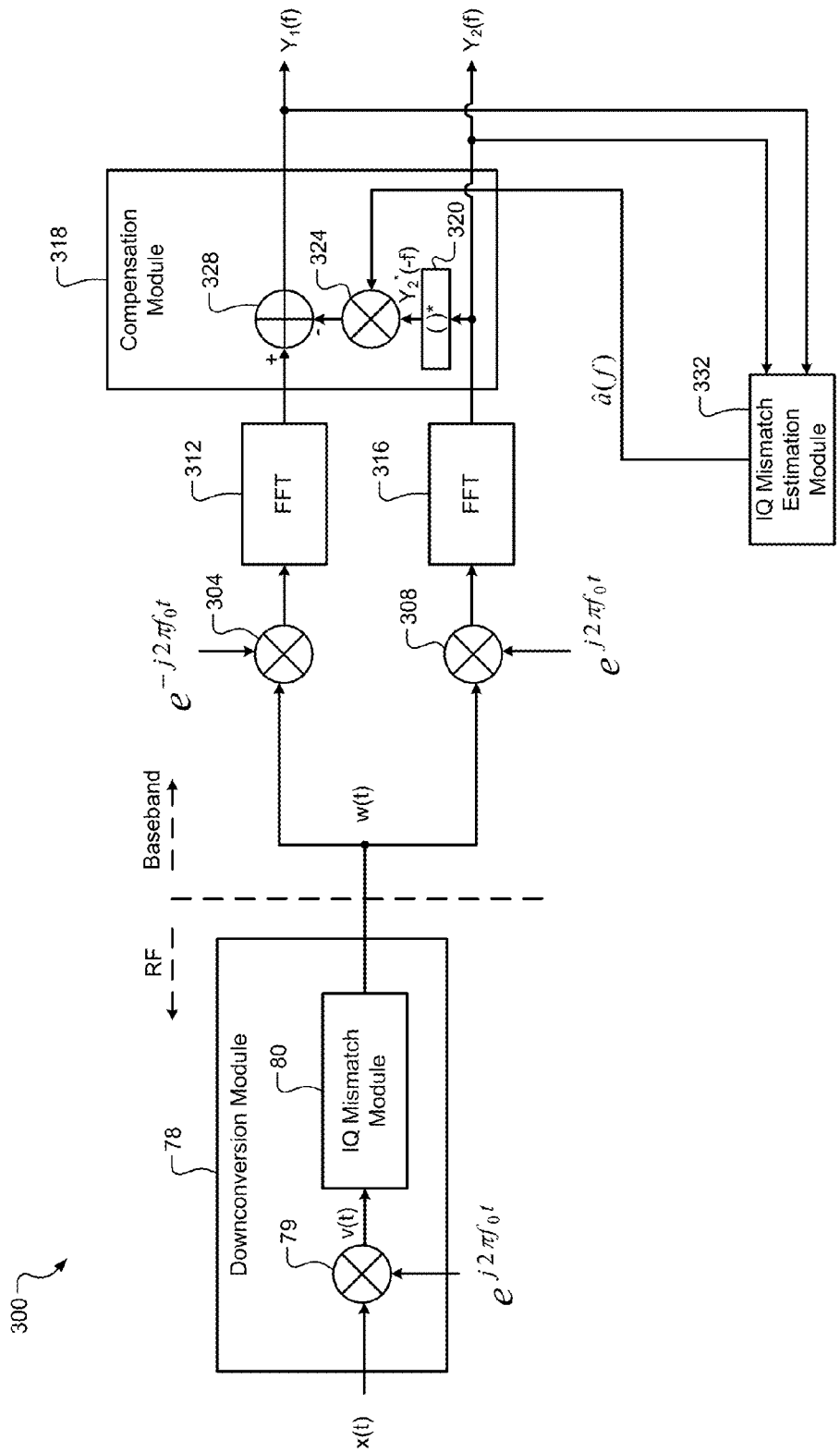
FIG. 7 is a functional block diagram of an IQ mismatch compensation circuit in accordance with an implementation of the present disclosure.

FIG. 7 shows an IQ mismatch compensation circuit 300 for frequency dependent IQ mismatch. The IQ mismatch compensation circuit 300 includes the downconversion module 78, mixers 304 and 308, FFT modules 312 and 316, and a compensation module 318. The compensation module 318 includes a complex conjugate module 320, a mixer 324, and a summer 328.

The CFO module 79 mixes (multiplies) the downconverted signal w(t) with the CFO signal $e^{j2\pi f_0 t}$. The IQ mismatch module 80 downconverts the mixed signal v(t) to produce the downconverted signal w(t). The mixer 304 mixes the downconverted signal w(t) with the CFO correction signal $e^{-j2\pi f_0 t}$ to shift and center the signal component. The mixer 308 mixes the downconverted signal w(t) with the CFO signal $e^{j2\pi f_0 t}$ to shift and center the image component. The FFT modules 312 and 316 perform FFTs on the outputs of the mixers 304 and 308 to generate first and second FFT signals, respectively. The second FFT signal is denoted $Y_2(f)$, and the image component is CFO corrected in the second FFT signal. The signal component is CFO corrected in the first FFT signal.

The complex conjugate module 320 determines the complex conjugate of the second FFT signal $Y_2(f)$ to produce a conjugate signal $Y_2^*(-f)$. The mixer 324 mixes (multiplies) the conjugate signal $Y_2^*(-f)$ with the complex compensation coefficients â(f) for the respective sub-bands. The summer 328 sums the first FFT signal with the output of the mixer 324 to produce the resulting $Y_1(f)$ signal. An IQ mismatch estimation module 332 determines the complex compensation coefficients â(f) for the sub-bands based on the $Y_1(f)$ signal. The IQ mismatch estimation module 332 includes modules similar to those of the IQ mismatch estimation module 60 discussed above and shown in FIG. 5.

Figure 8:
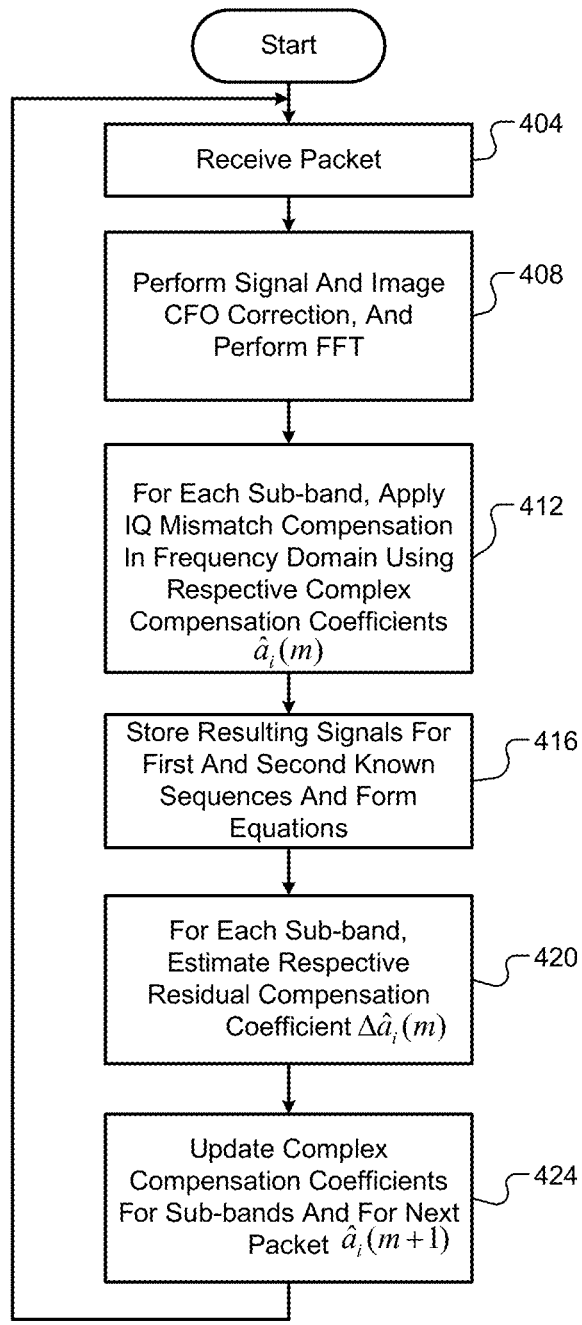
FIG. 8 is a flowchart depicting an example method of performing IQ mismatch compensation in accordance with an implementation of the present disclosure.

FIG. 8 includes a flowchart depicting an example method of performing frequency dependent IQ mismatch compensation. Control begins with 404 where the receiver 53 receives signals X(t) for a packet via the antenna 54. The CFO module 79 multiplies the received signal x(t) with the CFO signal $e^{j2\pi f_0 t}$ to generate the mixed signal v(t), and the IQ mismatch module 80 downconverts the mixed signal v(t) to produce a downconverted signal w(t).

At 408, the downconverted signal w(t) is mixed by the mixers 304 and 308 to perform signal and image correction. The FFT modules 312 and 316 also perform FFTs on the outputs of the mixers 304 and 308 at 408 to generate the first and second FFT signals, respectively.

At 412, the IQ estimation module 332 and the mixer 324 apply IQ mismatch compensation to the conjugate signal conjugate signal $Y_2^*(-f)$ using the complex compensation coefficients $â_i(m)$ for the respective sub-bands, $i-0, 1, \ldots, N-1$, for the current (m-th) packet. The summer 328 sums the first FFT signal output by the FFT module 312 with the output of the mixer 324 to produce the $Y_1(f)$ signal.

At 416, the receiving module 108 captures the signal $Y_1(f)$ resulting from the first known sequence $S_1(k)$ and captures the signal $Y_1(f)$ resulting from the second known sequence $S_2(k)$. The captured signals are $Y_{11}(k)$ and $Y_{12}(k)$. Also at 416, for each sub-band i, the dividing module 112 divides the captured signals $Y_{11}(k)$ and $Y_{12}(k)$ by the first and second known sequences $S_1(k)$ and $S_2(k)$, respectively, to form equations 20, 21, 22, and 23.

$$\hat{H}_{\text{diff}}(k) = \Delta\hat{a}_i \cdot \hat{H}_{RX}(k) + N_{\text{diff}}(k), \text{ where} \quad (20)$$

$$\hat{H}_{\text{diff}}(k) \doteq Y_{11}(k)/S_1(k) - Y_{12}(k)/S_2(k) \quad (21)$$

$$\hat{H}_{RX}(k) \doteq Y^*_{21}(-k)/S_1(k) - Y^*_{22}(-k)/S_2(k), \text{ and} \quad (22)$$

$$N_{\text{diff}}(k) \doteq N_1(k)/S_1(k) - N_2(k)/S_2(k), \quad (23)$$

for each subcarrier k=0, 1, ..., N−1, where N is the number of subcarriers in the signal bandwidth, and i=0, 1, ..., N. These values may be put in the form of vectors, as described above.

At 420, the residual module 116 determines the residual compensation coefficients $\Delta\hat{a}_i(m)$ for each sub-band i and the current (m-th) packet, for example, using equation 28.

$$\Delta\hat{a}_i(m) = (\hat{H}_{RX}^T \hat{H}_{RX})^{-1} \hat{H}_{RX}^T \hat{H}_{diff}, \quad (28)$$

where $$\hat{H}_{diff} \doteq [\hat{H}_{diff}(0) \hat{H}_{diff}(1) \ldots \hat{H}_{diff}(N_i-1)]^T \text{ and}$$

$$\hat{H}_{RX} \doteq [\hat{H}_{RX}(0) \hat{H}_{RX}(1) \ldots \hat{H}_{RX}(N_i-1)]^T.$$

The complex IQ mismatch module 120 determines the complex compensation coefficient $\hat{a}_i(m+1)$ for each sub-band and the next (m+1 th) packet at 424 based on the respective $\Delta\hat{a}_i(m)$ for the current (m-th) packet and the respective complex compensation coefficient $\hat{a}_i(m)$ for the current (m-th) packet. For example, the complex IQ mismatch module 120 may determine the complex compensation coefficient $\hat{a}_i(m+1)$ for the next (m+1 th) packet using equation 30.

$$\hat{a}_i(m+1) = \hat{a}_i(m) + \mu_i \cdot \max(-\delta_i, \min(\Delta\hat{a}_i(m), \delta_i)), \quad (30)$$

Control then returns to 404 for the next (m+1 th) packet, where the respective complex compensation coefficients $\hat{a}_i(m+1)$ will be used for the sub-bands.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, draft IEEE standard 802.11ah, and/or draft IEEE standard 802.11ax.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." In general, one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv)

source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A receiver comprising:
    a downconversion module configured to (i) receive a signal and (ii) downconvert the signal to generate a downconverted signal, wherein the downconverted signal includes in-phase/quadrature (IQ) mismatch;
    a compensation module configured to generate a compensated signal based on (i) the downconverted signal and (ii) an IQ mismatch compensation value;
    a first mixer configured to mix the compensated signal with a first oscillating signal generated by a local oscillator to shift a frequency of the compensated signal;
    a second mixer configured to mix the compensated signal with a second oscillating signal to shift a frequency of the compensated signal;
    a first Fast Fourier Transform (FFT) module configured to perform a FFT on an output of the first mixer to generate a first FFT signal;
    a second FFT module configured to perform a FFT on an output of the second mixer to generate a second FFT signal; and
    an IQ mismatch estimation module configured to
        capture a first portion of the first FFT signal and a second portion of the first FFT signal generated in response to the received signal including a first predetermined sequence and a second predetermined sequence, respectively,
        capture a first portion of the second FFT signal and a second portion of the second FFT signal generated in response to the received signal including the first predetermined sequence and the second predetermined sequence, respectively, and
        generate the IQ mismatch compensation value based on: (i) the first portions of the first and second FFT signals; (ii) the second portions of the first and second FFT signals; (iii) the first predetermined sequence; and (iv) the second predetermined sequence.

2. The receiver of claim 1, wherein the IQ mismatch estimation module is configured to
    divide the first portions of the first and second FFT signal by the first predetermined sequence to generate a first set of results,
    divide the second portions of the first and second FFT signal by the second predetermined sequence to generate a second set of results, and
    determine the IQ mismatch compensation value based on the first and second sets of results.

3. The receiver of claim 2, wherein the IQ mismatch estimation module is configured to determine a change value using the first and second sets of results and to determine the IQ mismatch compensation value based on the change value.

4. The receiver of claim 3, wherein the IQ mismatch estimation module is configured to determine the IQ mismatch compensation value by summing the change value with a last value of the IQ mismatch compensation value.

5. The receiver of claim 1, wherein the first and second predetermined sequences include channel estimation signals transmitted by a transmitter.

6. The receiver of claim 1, wherein the first and second predetermined sequences include synchronization signals transmitted by a transmitter.

7. The receiver of claim 1, wherein the IQ mismatch estimation module is configured to obtain the second predetermined sequence using the first predetermined sequence.

8. A receiver comprising:
    a downconversion module configured to (i) receive a signal and (ii) downconvert the signal to generate a downconverted signal that includes in-phase/quadrature (IQ) mismatch;
    a first mixer configured to (i) mix the downconverted signal with a first oscillating signal generated by a local oscillator and (ii) generate a first shifted signal;
    a second mixer configured to (i) mix the downconverted signal with a second oscillating signal and (ii) generate a second shifted signal;
    a first Fast Fourier Transform (FFT) module configured to perform a FFT on the first shifted signal to generate a first FFT signal;
    a second Fast Fourier Transform (FFT) module configured to perform a FFT on the second shifted signal to generate a second FFT signal;
    a compensation module configured to generate a compensated FFT signal based on the first FFT signal and IQ mismatch compensation values for frequency sub-bands, respectively; and
    an IQ mismatch estimation module configured to
        capture a first portion of the first FFT signal and a second portion of the first FFT signal generated in response to the received signal including first and second predetermined sequences, respectively
        capture a first portion of the second FFT signal and a second portion of the second FFT signal generated in response to the received signal including the first and second predetermined sequences, respectively, and
        generate the IQ mismatch compensation values for the frequency sub-bands, respectively, based on: (i) the first portions of the first and second FFT signals; (ii) the second portions of the first and second FFT signals; (iii) the first predetermined sequence; and (iv) the second predetermined sequence.

9. The receiver of claim 8, wherein the IQ mismatch estimation module is configured to generate the IQ mismatch compensation value for one of the frequency sub-bands based on: (i) third portions of the first portions of the first and second FFT signals corresponding to the one of the frequency sub-bands; (ii) fourth portions of the second portions of the first and second FFT signals corresponding to the one of the frequency sub-bands; (iii) the first predetermined sequence; and (iv) the second predetermined sequence.

10. The receiver of claim 9, wherein the IQ mismatch estimation module is configured to
    (i) divide the third portions corresponding to the one of the frequency sub-bands by a fifth portion of the first predetermined sequence corresponding to the one of the frequency sub-bands to generate a first set of results,
    (ii) divide the fourth portions corresponding to the one of the frequency sub-bands by a sixth portion of the second predetermined sequence corresponding to the one of the frequency sub-bands to generate a second set of results, and (iii) determine the IQ mismatch compensation value for the one of the frequency sub-bands based on the first and second sets of results.

11. The receiver of claim 8, wherein the first and second predetermined sequences include at least one of: (i) channel estimation signals transmitted by a transmitter; and (ii) synchronization signals transmitted by a transmitter.

12. The receiver of claim 8, wherein the compensation module is configured to (i) generate a conjugate signal based on a conjugate of the second FFT signal, (ii) mix the frequency sub-bands of the conjugate signal with the IQ mismatch compensation values of the frequency sub-bands to generate mixed compensation values, respectively, and (iii) sum the frequency sub-bands of the mixed compensation values with the frequency sub-bands of the first FFT signal to generate a compensated FFT signal.

13. A method of compensating for IQ mismatch, the method comprising:
    receiving a signal at a receiver;
    downconverting the signal to generate a downconverted signal, wherein the downconverted signal includes in-phase/quadrature (IQ) mismatch;
    generating a compensated signal based on (i) the downconverted signal and (ii) an IQ mismatch compensation value;
    performing a first mixing of the compensated signal with a first oscillating signal generated by a local oscillator to shift a frequency of the compensated signal;
    performing a second mixing of the compensated signal with a second oscillating signal to shift a frequency of the compensated signal;
    performing a Fast Fourier Transform (FFT) on a result of the first mixing to generate a first FFT signal;
    performing a FFT on a result of the second mixing to generate a second FFT signal;
    capturing a first portion of the first FFT signal and a second portion of the first FFT signal generated in response to the received signal including a first predetermined sequence and a second predetermined sequence, respectively;
    capturing a first portion of the second FFT signal and a second portion of the second FFT signal generated in response to the received signal including the first predetermined sequence and the second predetermined sequence, respectively; and
    generating the IQ mismatch compensation value based on: (i) the first portions of the first and second FFT signal; (ii) the second portions of the first and second FFT signals; (iii) the first predetermined sequence; and (iv) the second predetermined sequence.

14. The method of claim 13, further comprising:
    dividing the first portions of the first and second FFT signal by the first predetermined sequence to generate a first set of results;
    dividing the second portions of the first and second FFT signal by the second predetermined sequence to generate a second set of results; and
    determining the IQ mismatch compensation value based on the first and second sets of results.

15. The method of claim 14, further comprising:
    determining a change value using the first and second sets of results; and
    determining the IQ mismatch compensation value based on the change value.

16. The method of claim 15, further comprising determining the IQ mismatch compensation value by summing the change value with a last value of the IQ mismatch compensation value.

17. The method of claim 13, wherein the first and second predetermined sequences include channel estimation signals transmitted by a transmitter.

18. The method of claim 13, wherein the first and second predetermined sequences include synchronization signals transmitted by a transmitter.

19. The method of claim 13, further comprising obtaining the second predetermined sequence using the first predetermined sequence.

20. A method of compensating for IQ mismatch, the method comprising:
    receiving a signal at a receiver;
    downconverting the signal to generate a downconverted signal that includes in-phase/quadrature (IQ) mismatch;
    mixing the downconverted signal with a first oscillating signal generated by a local oscillator to produce a first shifted signal;
    mixing the downconverted signal with a second oscillating signal to produce a second shifted signal;
    performing a Fast Fourier Transform (FFT) on the first shifted signal to generate a first FFT signal;
    performing a FFT on the second shifted signal to generate a second FFT signal;
    generating a compensated FFT signal based on the first FFT signal and IQ mismatch compensation values for frequency sub-bands, respectively;
    capturing a first portion of the first FFT signal and a second portion of the first FFT signal generated in response to the received signal including first and second predetermined sequences, respectively;
    capturing a first portion of the second FFT signal and a second portion of the second FFT signal generated in response to the received signal including the first and second predetermined sequences, respectively; and
    generating the IQ mismatch compensation values for the frequency sub-bands, respectively, based on: (i) the first portions of the first and second FFT signals; (ii) the second portions of the first and second FFT signals; (iii) the first predetermined sequence; and (iv) the second predetermined sequence.

21. The method of claim 20, further comprising generating the IQ mismatch compensation value for one of the frequency sub-bands based on: (i) third portions of the first portions of the first and second FFT signals corresponding to the one of the frequency sub-bands; (ii) fourth portions of the second portions of the first and second FFT signals corresponding to the one of the frequency sub-bands; (iii) the first predetermined sequence; and (iv) the second predetermined sequence.

22. The method of claim 21 further comprising:
    dividing the third portions corresponding to the one of the frequency sub-bands by a fifth portion of the first predetermined sequence corresponding to the one of the frequency sub-bands to generate a first set of results;
    dividing the fourth portions corresponding to the one of the frequency sub-bands by a sixth portion of the second predetermined sequence corresponding to the one of the frequency sub-bands to generate a second set of results; and
    determining the IQ mismatch compensation value for the one of the frequency sub-bands based on the first and second sets of results.

23. The method of claim 20, wherein the first and second predetermined sequences include at least one of: (i) channel estimation signals transmitted by a transmitter; and (ii) synchronization signals transmitted by a transmitter.

24. The method of claim 20 further comprising:
generating a conjugate signal based on a conjugate of the second FFT signal;
mixing the frequency sub-bands of the conjugate signal with the IQ mismatch compensation values of the frequency sub-bands to generate mixed compensation values, respectively; and
summing the frequency sub-bands of the mixed compensation values with the frequency sub-bands of the first FFT signal to generate a compensated FFT signal.

\* \* \* \* \*